(12) United States Patent
Mino

(10) Patent No.: US 6,782,433 B2
(45) Date of Patent: Aug. 24, 2004

(54) DATA TRANSFER APPARATUS

(75) Inventor: Yoshiteru Mino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 321 days.

(21) Appl. No.: 09/747,685

(22) Filed: Dec. 26, 2000

(65) Prior Publication Data

US 2001/0016883 A1 Aug. 23, 2001

(30) Foreign Application Priority Data

Dec. 27, 1999 (JP) .......................................... 11-371918

(51) Int. Cl.[7] .......................... G06F 13/20; G06F 13/28
(52) U.S. Cl. ............................. 710/22; 710/28; 710/33; 710/52; 710/53; 710/60; 711/147
(58) Field of Search .............................. 710/22, 28, 33, 710/52, 53, 60; 711/147

(56) References Cited

U.S. PATENT DOCUMENTS

| | | | | | |
|---|---|---|---|---|---|
| 4,722,051 | A | * | 1/1988 | Chattopadhya | 710/22 |
| 5,155,830 | A | * | 10/1992 | Kurashige | 710/24 |
| 5,426,737 | A | | 6/1995 | Jacobs | |
| 5,511,152 | A | * | 4/1996 | Lai et al. | 358/1.16 |
| 5,663,942 | A | | 9/1997 | Ishibashi et al. | |
| 5,799,169 | A | * | 8/1998 | Kalapathy | 703/25 |
| 5,922,057 | A | * | 7/1999 | Holt | 710/52 |
| 6,161,153 | A | * | 12/2000 | Porterfield et al. | 710/52 |
| 6,205,517 | B1 | * | 3/2001 | Sugaya | 711/117 |
| 6,223,266 | B1 | * | 4/2001 | Sartore | 711/170 |
| 6,345,327 | B1 | * | 2/2002 | Baskey et al. | 710/52 |
| 6,388,989 | B1 | * | 5/2002 | Malhotra | 370/229 |
| 6,567,908 | B1 | * | 5/2003 | Furuhashi | 711/211 |

FOREIGN PATENT DOCUMENTS

| | | |
|---|---|---|
| JP | 61-224063 | 10/1986 |
| JP | 62-098444 | 5/1987 |
| JP | 08-221356 | 8/1996 |

* cited by examiner

Primary Examiner—Rehana Perveen
(74) Attorney, Agent, or Firm—RatnerPrestia

(57) ABSTRACT

There is provided a data transfer apparatus for transferring data from a main memory coupled to a main bus to a local memory coupled to a local bus. The data transfer apparatus includes: a first-in-first-out buffer having a data region for storing one or more words of CPU access data which is accessed by a CPU coupled to the main bus, and a plurality of words of DMA access data which is accessed by a DMA controller coupled to the main bus; and a controller for controlling the first-in-first-out buffer. When the local bus is available, the controller controls the first-in-first-out buffer so as to consecutively transfer the one or more words of CPU access data stored in the data region to the local memory, and to burst transfer the plurality of words of DMA access data stored in the data region to the local memory.

4 Claims, 7 Drawing Sheets

DATA TRANSFER APPARATUS

BACKGROUND OF THE INVENTION

1. Field of the Invention

The present invention relates to a data transfer apparatus for transferring data from a main memory which is coupled to a main bus to a local memory which is coupled to a local bus.

2. Description of the Related Art

FIG. 6 shows the structure of a conventional data transfer apparatus 100.

The data transfer apparatus 100 transfers data from a main memory 112 to a local memory 156.

The data transfer apparatus 100 includes a main bus interface 127, a local bus interface 134, a DMA top address register 120, a DMA transfer word number register 121 for storing the number of words to be DMA-transferred, an adder 104, a subtracter 103, and a controller 122.

The main bus interface 127 and the local bus interface 134 are interconnected via an internal data line 151 and an internal address line 152.

The main bus interface 127 is coupled to a main data bus 113 and a main address bus 150. The main data bus 113 and the main address bus 150 are both coupled to peripheral devices for the data transfer apparatus 100, e.g., a CPU 110, a DMA controller 111, and a main memory 112.

The local bus interface 134 is coupled to a local data bus 128 and a local address bus 135. The local data bus 128 and the local address bus 135 are both coupled to peripheral devices for the data transfer apparatus 100, e.g., a local memory 156, via a bus interface 155.

An internal data processor 161 is further coupled to the local data bus 128 and the local address bus 135. The data transfer apparatus 100 and the internal data processor 161 are of a unified memory architecture sharing the local memory 156. The internal data processor 161 may be, for example, a video output processing circuit.

Herein, it is assumed that when transferring one word at a time from the CPU 110 and the DMA controller 111 to the local memory 156, the internal bus transfer cycle (or "local bus transfer cycle") may be ½ of the external bus transfer cycle (or "main bus transfer cycle").

In practice, however, the external bus transfer cycle and the internal bus transfer cycle may be 10 MHz and 100 MHz, respectively. One reason for this is that the clock of an internal bus of a chip is designed for a faster operation than the clock of an external bus of the chip.

In the present specification, any data transfer by the CPU 110 from the main memory 112 to the local memory 156 will be referred to as a "CPU transfer". Any data transfer by the DMA controller 111 from the main memory 112 to the local memory 156 will be referred to as a "DMA transfer".

The operation of the CPU 110, the DMA controller 111, and the data transfer apparatus 100 will be summarized below.

The main memory 112 and the local memory 156 are memory-mapped to the CPU 110 and the DMA controller 111.

The CPU 110 and the DMA controller 111, which alternately or consecutively acquire the right to use the main data bus 113, transfer data via the data transfer apparatus 100.

(CPU Transfer)

Once acquiring the right to use the main data bus 113, the CPU 110 reads data from the main memory 112 (as a "transfer source") via the main data bus 113 and the main address bus 150. The CPU 110 asserts a CPU access control signal 123 which is output to the data transfer apparatus 100, and outputs the data which has been read from the main memory 112 to the data transfer apparatus 100 (as a "transfer destination") via the main data bus 113 and the main address bus 150.

(DMA Transfer)

In the case of a DMA transfer, it is necessary to utilize the CPU 110 to establish initial settings for DMA transfer in the DMA controller 111 and the data transfer apparatus 100.

First, a top address of the main memory 112 (which is the transfer source) and the number of words to be transferred are set in an internal register (not shown) of the DMA controller 111, and a request is made to begin a DMA transfer.

Next, through a CPU access, the CPU 110 sets a top address of the local memory 156 (which is the transfer destination) for DMA transfer, the top address being set in the DMA top address register 120 in the data transfer apparatus 100.

Next, through a CPU access, the CPU 110 sets the number of DMA transfers to be made in the DMA transfer word number register 121 in the data transfer apparatus 100.

As soon as the initial settings for DMA transfer are complete and the data transfer apparatus 100 becomes ready for data transfer to the local memory 156, the data transfer apparatus 100 asserts a DMA request signal 126.

Upon detecting the assertion of the DMA request signal 126 and acquiring the right to use the main data bus 113, the DMA controller 111 reads data from the main memory 112 (as a "transfer source") via the main data bus 113 and the main address bus 150. The DMA controller 111 asserts a DMA access control signal 125 which is output to the data transfer apparatus 100, and outputs the data which has been read from the main memory 112 to the data transfer apparatus 100 (as a "transfer destination") via the main data bus 113.

During a DMA transfer, no address for the local memory 156 is output to the data transfer apparatus 100 as a transfer destination.

Next, the operations of the data transfer apparatus 100 and the bus controller 133 will be summarized below.

When performing a CPU transfer or a DMA transfer, the data transfer apparatus 100 outputs a local bus request signal 130 to the bus controller 133 for requesting a right to use the local data bus 128 and the local address bus 135, to which the local memory 156 (which is the data transfer destination) is coupled. Herein, it is assumed that the local data bus 128 and the local address bus 135 are shared by a plurality of processing blocks. In the case where a local bus request signal 160 has not been issued from the internal data processor 161, the bus controller 133 outputs a local bus grant signal 129 to the data transfer apparatus 100.

Next, the internal operation of the data transfer apparatus 100 will be described.

(CPU Transfer)

Data and a local memory address which are output from the CPU 110 along with the CPU access control signal 123 are temporarily stored in the main bus interface 127.

Upon receiving the CPU access control signal 123 from the CPU 110, the controller 122 asserts a wait control signal 124 which is output to the CPU 110, and outputs the local bus request signal 130 to the bus controller 133.

Upon receiving the local bus grant signal 129 from the bus controller 133, the controller 122 outputs a local bus control signal 162 to the local bus interface 134. In accordance with the local bus control signal 162, the local bus interface 134 outputs the data on the internal data line 151 to the local data bus 128, and outputs an address on the internal address line 152 to the local address bus 135.

The local bus control signal 162 includes a field which indicates the timing with which to output data on the local data bus 128 and an address selection field which indicates whether the address on the internal address line 152 or the address on the DMA address line 153 is to be output to the local address bus 135. In the case of a CPU transfer, the address selection field of the local bus control signal 162 is prescribed so that the address on the internal address line 152 is output to the local address bus 135.

The bus interface 155 decodes the address on the local address bus 135, and outputs the data on the local data bus 128 to the local memory 156 in accordance with the decoded address.

(DMA Transfer)

The controller 122 outputs the local bus request signal 130 to the bus controller 133.

If the local bus request signal 160 from the internal data processor 161 has not been asserted, the bus controller 133 outputs the local bus grant signal 129 to the controller 122.

Upon detecting the assertion of the local bus grant signal 129, the controller 122 outputs the DMA request signal 126 to the DMA controller 111. Upon receiving the asserted DMA access control signal 125 from the DMA controller 111, the controller 122 negates the DMA request signal 126, and outputs the local bus control signal 162 to the local bus interface 134. In the case of a DMA transfer, the address selection field of the local bus control signal 162 is prescribed so that the address on the DMA address line 153 is output to the local address bus 135.

In the case of a DMA transfer, the top address of the local memory 156 is previously set in the DMA top address register 120, and the number of words to be DMA-transferred is previously set in the DMA transfer word number register 121. In synchronization with the DMA access control signal 125, which is input as the DMA access begins, the controller 122 asserts a DMA start request signal 158.

Upon detecting the assertion of the DMA start request signal 158, the adder 104 increments the previous DMA address by one word, beginning from an initial value (i.e., the value stored in the DMA top address register 120), outputs the incremented DMA address to the DMA address line 153, and asserts a DMA address generation complete signal 154.

Upon detecting the assertion of the DMA start request signal 158, the subtracter 103 decrements the previous number of remaining words to be DMA-transferred by one word, beginning from an initial value (i.e., the value stored in the DMA transfer word number register 121). If the number of remaining words to be DMA-transferred is one, the subtracter 103 asserts a number-of-remaining-words to be DMA-transferred flag 157.

If no access is made by the CPU 110 when the data transfer to the local data bus 128 is completed, the controller 122 keeps asserting the DMA request signal 126 which is output to the DMA controller 111 until detection of the negation of the number-of-remaining-words to be DMA-transferred flag 157.

FIG. 7 illustrates an operation sequence of the data transfer apparatus 100 in the case where both CPU transfers and DMA transfers are performed.

In FIG. 7, it is assumed that the L (low) level of each signal corresponds to an asserted state of that signal, and the H (high) level of each signal corresponds to a negated state of that signal.

In the example illustrated in FIG. 7, a one-word CPU transfer is performed five times, and a ten-word DMA transfer is performed one time.

It is assumed that the aforementioned initial values for DMA transfer are set prior to a cycle T1. The data transfer apparatus 100 asserts the DMA request signal 126. Detecting the assertion of the DMA request signal 126, the DMA controller 111 asserts a DMA transfer request signal 197.

Now, it is also assumed that the CPU 110, although having detected the assertion of the DMA transfer request signal 197, will determine that a CPU transfer is to be made in the next and subsequent cycles. As a result, an external bus transfer (CPU_M1) between the CPU 110 and the data transfer apparatus 100 occurs during the cycles T1 and T2 (which cycles define a CPU basic access time). The CPU 110 begins to assert the CPU access control signal 123 in the cycle T1.

Upon detecting the assertion of the CPU access control signal 123, the data transfer apparatus 100 asserts the wait control signal 124. While the wait control signal 124 is being asserted, the CPU 110 is controlled so that neither a CPU transfer nor a DMA transfer can be made in the next and subsequent cycles.

In a cycle T3, an internal bus transfer (CPU_L1) occurs between the data transfer apparatus 100 and the local memory 156.

Once the internal bus transfer (CPU_L1) is completed, the data transfer apparatus 100 negates the wait control signal 124.

Upon detecting the negation of the wait control signal 124, the CPU 110 negates the CPU access control signal 123, and begins preparation for performing a CPU transfer or a DMA transfer in the next cycle. Herein, it is assumed that the CPU 110 detects the assertion of the DMA transfer request signal 197 and determines that a DMA transfer is to be made in the next cycle. In this case, the CPU 110 asserts a DMA transfer permission signal 196 which is output to the DMA controller 111.

Upon detecting the assertion of the DMA transfer permission signal 196, the DMA controller 111 performs an external bus transfer (DMA_M1) between the DMA controller 111 and the data transfer apparatus 100 with the cycles T1 and T2 defining a DMA basic access time, and asserts the DMA access control signal 125. The DMA access control signal 125 is asserted only during the DMA basic access time.

Upon detecting the assertion of the DMA access control signal 125, the data transfer apparatus 100 negates the DMA request signal 126.

In the cycle T6, an internal bus transfer (DMA_L1) occurs between the data transfer apparatus 100 and the local memory 156.

Once the internal bus transfer (DMA_L1) is completed, the data transfer apparatus 100 detects the number of remaining words to be DMA-transferred, and begins to assert the DMA request signal 126.

Upon detecting the assertion of the DMA request signal 126, the DMA controller 111 begins to assert the DMA transfer request signal 197.

Thereafter, the CPU 110 performs a CPU transfer or a DMA transfer in an alternate or consecutive manner. However, the internal bus transfer between the data transfer apparatus 100 and the local memory 156 must wait if any internal bus transfer (e.g., INT_1) is occurring between the internal data processor 161 and the local memory 156, until such an internal bus transfer is completed. As a result, more cycles are required to perform a data transfer between the CPU 110 and the data transfer apparatus 100.

In a cycle T7, the CPU 110 asserts the CPU access control signal 123, thereby instructing the data transfer apparatus 100 to start a data transfer. Upon detecting the assertion of the CPU access control signal 123, the data transfer apparatus 100 outputs the local bus request signal 130 to the bus controller 133, thereby requesting a right to use the local bus from the bus controller 133. In the example illustrated in FIG. 7, however, the bus controller 133 gives a right to use the local bus to the internal data processor 161, rather than the data transfer apparatus 100, because the internal data processor 161 has similarly requested a right to use the local bus.

In a cycle T8, an internal bus transfer (INT_1) between the internal data processor 161 and the local memory 156 begins. The internal bus transfer (INT_1) is continued until the end of a cycle T12.

At the end of the cycle T12, the bus controller 133 gives a right to use the local bus to the data transfer apparatus 100.

In a cycle T13, an internal bus transfer (CPU_L2) between the data transfer apparatus 100 and the local memory 156 occurs. Once the internal bus transfer (CPU_L2) is completed, the data transfer apparatus 100 negates the wait control signal 124. Upon detecting the negation of the wait control signal 124, the CPU 110 negates the CPU access control signal 123.

Thereafter, the CPU 110 and the DMA controller 111 compete with each other for a right to use the main buses so as to transfer data to the data transfer apparatus 100.

In a cycle T47, the DMA access control signal 125 is detected for a tenth time. At this point, the number of remaining words to be DMA-transferred reaches zero, so that the DMA request signal 126 from the data transfer apparatus 100 is negated. Thereafter, any DMA transfer will be resumed only after the aforementioned initial values for DMA transfer are again set by the CPU 110 in advance.

As described above, an internal bus transfer between the conventional data transfer apparatus 100 and the local memory 156 must wait until any internal bus transfer occurring between the internal data processor 161 and the local memory 156 is completed.

Thus, the conventional data transfer apparatus 100 is controlled so as to defer a CPU transfer, or to not output a DMA transfer request to the DMA controller 111, until the local bus becomes available. As a result, it is difficult to improve the overall data transfer rate of the entire system including the data transfer apparatus 100 and any peripheral devices associated therewith.

SUMMARY OF THE INVENTION

According to the present invention, there is provided a data transfer apparatus for transferring data from a main memory coupled to a main bus to a local memory coupled to a local bus, the data transfer apparatus including: a first-in-first-out buffer having a data region for storing one or more words of CPU access data which is accessed by a CPU coupled to the main bus, and a plurality of words of DMA access data which is accessed by a DMA controller coupled to the main bus; and a controller for controlling the first-in-first-out buffer, wherein, when the local bus is available, the controller controls the first-in-first-out buffer so as to consecutively transfer the one or more words of CPU access data stored in the data region to the local memory, and to burst transfer the plurality of words of DMA access data stored in the data region to the local memory.

In one embodiment of the invention, the controller executes local DMA transfers in units, where each unit comprises the plurality of words of DMA access data stored in the data region, and makes a request to use the local bus per unit of local DMA transfer.

In another embodiment of the invention, the controller executes the transfer of the one or more words of CPU access data stored in the data region in the form of a local DMA transfer, and the transfer of the plurality of words of DMA access data stored in the data region in the form of a local DMA transfer.

In still another embodiment of the invention, the first-in-first-out buffer further includes a region for storing information with which to determine whether the data stored in the data region is CPU access data or DMA access data.

Thus, the invention described herein makes possible the advantage of providing a data transfer apparatus which can improve an overall data transfer rate of an entire system including the data transfer apparatus itself and any peripheral devices associated therewith.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described with reference to the accompanying figures.

EXAMPLE 1

Figure 1:
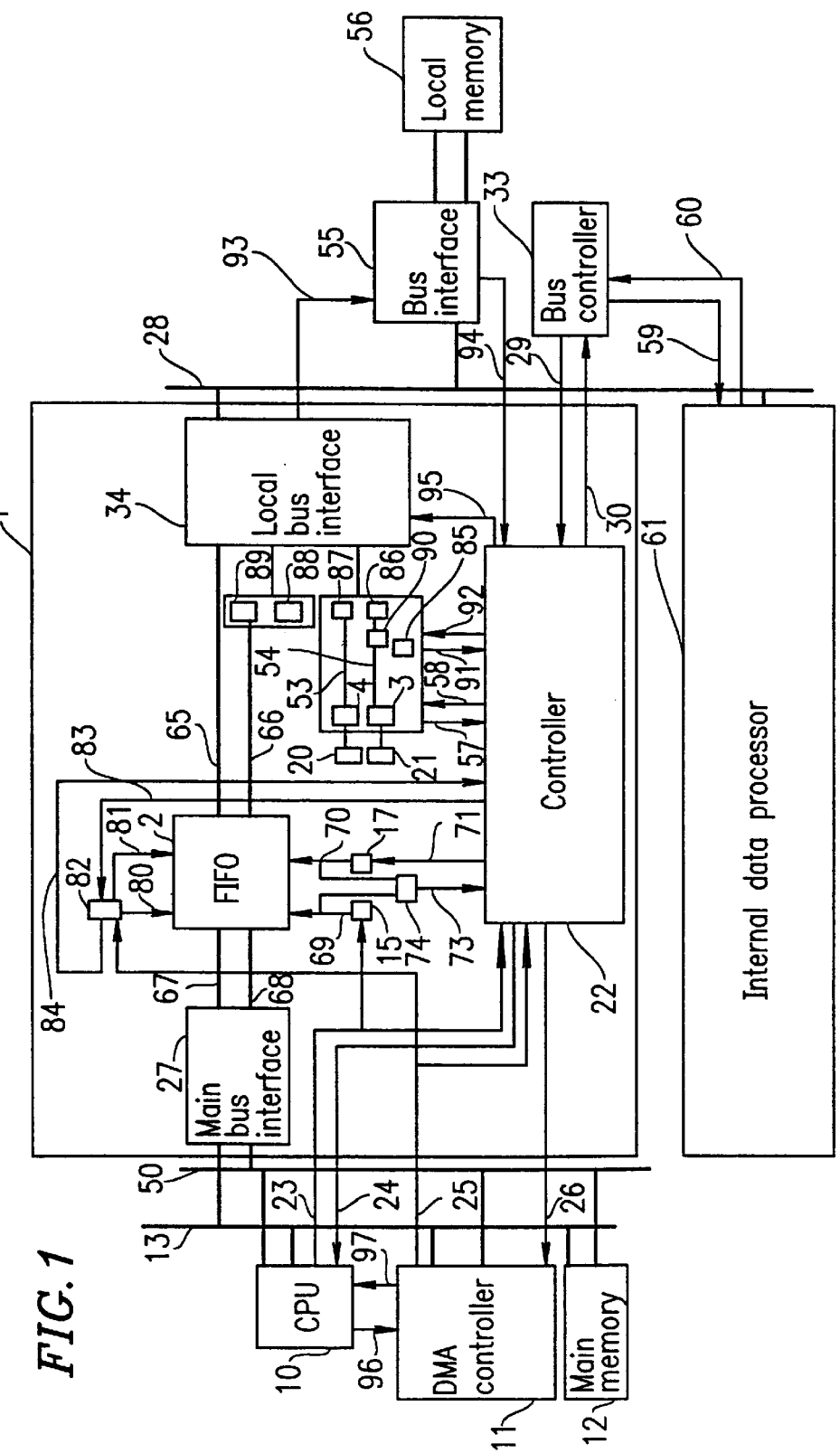
FIG. 1 is a block diagram illustrating a structure of a data transfer apparatus 1 according to Example 1 of the present invention.

FIG. 1 is a block diagram illustrating the structure of a data transfer apparatus 1 according to Example 1 of the present invention.

The data transfer apparatus 1 is coupled to a main data bus 13 and a main address bus 50. The main data bus 13 and the main address bus 50 are coupled to peripheral devices for the data transfer apparatus 1, e.g., a CPU 10, a DMA controller 11, and a main memory 12. In the present specification, the main data bus 13 and the main address bus 50 will be collectively referred to as the "main buses".

The data transfer apparatus 1 is also coupled to a local data bus 28. The local data bus 28 is coupled to peripheral devices for the data transfer apparatus 1, i.e., a local memory 56, via a bus interface 55. In the present specification, the local data bus 28 may also be referred to as the "local bus".

An internal data processor 61 is further coupled to the local data bus 28. The data transfer apparatus 1 and the internal data processor 61 are of a unified memory architecture sharing the local memory 56.

Herein, it is assumed that the internal data processor 61 is a video output processing circuit. The video output processing circuit is operative, with a predetermined timing scheme, to output frame data which has been stored in the local memory 56 to an external output device (not shown), e.g., a monitor, in accordance with an external synchronization signal (not shown). In this case, the bus controller 33 controls the data transfer apparatus 1 and the internal data processor 61 so that the video output processing circuit can acquire a right to use the local data bus 28 with a higher priority than that given to the data transfer between the CPU 10 and the data transfer apparatus 1.

The data transfer apparatus 1 transfers data from the main memory 12 to the local memory 56. The transferred data is either data to be accessed by the CPU 10 (hereinafter referred to as a "CPU access data") or data to be accessed by the DMA controller 11 (hereinafter referred to as a "DMA access data").

In the case of a CPU transfer, the CPU 10 reads data from the main memory 12, and outputs the read data to the data transfer apparatus 1 as CPU access data. In the case of a DMA transfer, the DMA controller 11 reads data from the main memory 12, and outputs the read data to the data transfer apparatus 1 as DMA access data.

The data transfer apparatus 1 includes a main bus interface 27, a local bus interface 34, a first-in-first-out (FIFO) buffer 2, and a controller 22.

The FIFO 2 is coupled to the main bus interface 27 via a data line 67 and an address line 68. The FIFO 2 is also coupled to the local bus interface 34 via a data line 65. The FIFO 2 is also coupled to a register 89 via an address line 66.

A write pointer generator 15, a read pointer generator 17, and a DMA pointer generator 82 are used for generating pointers with which to access the FIFO 2.

The write pointer generator 15 generates a write pointer 69 by incrementing a previous write pointer by one word in response to a CPU access control signal 23. The generated write pointer 69 is output to the FIFO 2.

The DMA pointer generator 82 generates a write pointer 80 by incrementing a previous internal pointer by one word in response to a DMA access control signal 25. The generated write pointer 80 is output to the FIFO 2.

The DMA pointer generator 82 counts the number of times the DMA access control signal 25 has been input, and when the number becomes equal to the number of words in a data subregion 230 for DMA transfer in the FIFO 2 (FIG. 2), the DMA pointer generator 82 initializes the internal pointer, and outputs a local DMA complete signal 84 to the controller 22.

The DMA pointer generator 82 generates a read pointer 81 by incrementing a previous internal pointer by one word in response to a DMA transfer control signal 83. The generated read pointer 81 is output to the FIFO 2.

The DMA pointer generator 82 counts the number of times the DMA transfer control signal 83 has been input, and when the number becomes equal to the number of words in the data subregion 230 for DMA transfer in the FIFO 2 (FIG. 2), the DMA pointer generator 82 initializes the internal pointer, and outputs the local DMA complete signal 84 to the controller 22.

A pointer comparator 74 compares the write pointer 69 and the read pointer 70, and outputs a FIFO flag 73 to the controller 22, where the FIFO flag 73 has a value in accordance with the comparison result. The value of the FIFO flag 73 is "0" when there is no CPU access data stored in the FIFO 2; the value of the FIFO flag 73 is "1" when there is CPU access data stored in the FIFO 2; and the value of the FIFO flag 73 is "2" when the number of CPU access data stored in the FIFO 2 is equal to an upper limit of the number of CPU access data storable in the FIFO 2.

An adder 4 increments the DMA address by one word, from an initial value which is previously set in a DMA top address register 20, in response to a DMA start request signal 58 which is output from the controller 22 every time the DMA access control signal 25 is input thereto. As a result, the adder 4 outputs an updated DMA address to an address line 53.

A subtracter 3 decrements the number of words to be DMA-transferred by one word, from an initial value which is previously set in a DMA transfer word number register 21 for storing the number of words to be DMA-transferred, in response to the DMA start request signal 58 which is output from the controller 22 every time the DMA access control signal 25 is input thereto. As a result, the subtracter 3 outputs an updated number of words to be DMA-transferred to a transfer word number line 54.

In the present example, any CPU transfer is processed as a local DMA transfer of one word, and any DMA transfer is processed as a local DMA transfer of a plurality of words. Thus, the CPU transfers and DMA transfers are processed in a unified manner as local DMA transfers.

It should be noted that the DMA transfer between the DMA controller 11 and the data transfer apparatus 1 occurs in a number of split units, each based on a "basic number" of local DMA transfer, which is prescribed to be equal to an upper limit of DMA access data storable in the FIFO 2.

Firstly, a protocol for controlling the FIFO 2 in the case of a CPU transfer and an exemplary setting of local DMA transfer parameters necessary for processing each CPU transfer as a local DMA transfer of one word will be described.

The FIFO 2 sequentially stores the CPU access data which is input via the main bus interface 27, at a position designated by the write pointer 69, which is updated in response to the CPU access control signal 23.

The pointer comparator 74 compares the write pointer 69 and the read pointer 70, and outputs a FIFO flag 73 to the controller 22, where the FIFO flag 73 has a value in accordance with the comparison result. The value of the FIFO flag 73 is "0" when there is no CPU access data stored in the FIFO 2; the value of the FIFO flag 73 is "1" when there is CPU access data stored in the FIFO 2; and the value of the FIFO flag 73 is "2" when the number of CPU access data stored in the FIFO 2 is equal to the upper limit of the number of CPU access data storable in the FIFO 2.

If the value of the FIFO flag 73 is "1" or "2", then the controller 22 outputs a local bus request signal 30 to the bus controller 33. Upon receiving a local bus grant signal 29 from the bus controller 33, the controller 22 outputs a read pointer generation request signal 71 to the read pointer generator 17. The read pointer generator 17 generates the read pointer 70 in response to the read pointer generation request signal 71, and outputs the generated read pointer 70 to the FIFO 2.

The FIFO 2 outputs CPU access data which is designated by the read pointer 70 to the data line 65, and outputs a CPU access address which is designated by the read pointer 70 to the address line 66.

The register 89 is used for designating a local DMA top address for CPU transfer. The local DMA top address register 89 stores an address on the address line 66 in response to an internal synchronization signal (not shown).

A register 88 is used for designating a number of words to be local DMA-transferred for CPU transfer. The register 88 is a fixed register indicating one word.

When performing a CPU transfer, the output of the register 89 and the output of the register 88 are output to the local bus interface 34.

Secondly, a protocol for controlling the FIFO 2 in the case of a DMA transfer and an exemplary setting of local DMA transfer parameters necessary for processing each DMA transfer as a local DMA transfer of a plurality of words will be described.

The FIFO 2 sequentially stores the DMA access data which is input via the main bus interface 27, at a position designated by the DMA write pointer 80, which is updated in response to the DMA access control signal 25. If the number of DMA access data stored in the FIFO 2 has reached the upper limit value, the FIFO 2 outputs the local DMA complete signal 84 to the controller 22.

Upon receiving the local DMA complete signal 84, the controller 22 outputs the local bus request signal 30 to the bus controller 33. Thus, the controller 22 executes local DMA transfer in units, where each unit includes a plurality of words of DMA access data stored in the FIFO 2, and makes a request to use the local bus per unit of local DMA transfer. As a result, it is possible to reduce the number of requests which are made to use the local bus.

Upon receiving the local bus grant signal 29 from the bus controller 33, the controller 22 outputs the DMA start request signal 58, the DMA transfer control signal 83, and a local DMA transfer start signal 92. Upon receiving a local DMA transfer complete signal 91, the controller 22 again outputs the local bus request signal 30 to the bus controller 33, and repeats similar processing. Once a number-of-remaining-words to be DMA-transferred flag 57 is asserted, the controller 22 terminates the DMA transfer process.

A register 87 is used for designating a local DMA top address for DMA transfer. Responsive to the local DMA transfer start signal 92 output from the controller 22, the register 87 outputs a DMA address on the DMA address line 53 to the local bus interface 34 as a local DMA top address.

The register 86 is used for designating a number of words to be local DMA-transferred for DMA transfer. The register 86 stores the output of a comparator 90. The register 86 outputs the output of the comparator 90 to the local bus interface 34 as the number of words to be local DMA-transferred.

The comparator 90 compares the number of words to be DMA-transferred that are present on the transfer word number line 54 against the aforementioned local DMA transfer basic number, and sets the smaller of the two in the register 86 as a number of words to be local DMA-transferred. Furthermore, the comparator 90 compares the output value of a local DMA transfer counter 85 against the number of words to be local DMA-transferred, and outputs the local DMA transfer complete signal 91 to the controller 22 if the two values are equal.

The local DMA transfer counter 85 initializes the count number in response to the local DMA transfer start signal 92 which is output from the controller 22, and counts the pulses of an internal synchronization signal (not shown).

The controller 22 outputs to the local bus interface 34 an access control signal 95 to select either local DMA transfer parameters for CPU transfer or local DMA transfer parameters for DMA transfer in accordance with predetermined priority levels.

In the case where a higher priority is to be given to a CPU transfer than to a DMA transfer, the local bus interface 34 sets the output of the register 89 and the output of the register 88 in the bus interface 55 as local DMA transfer parameters. Such a setting may be achieved via a DMA control line 93.

In the case where a higher priority is to be given to a DMA transfer than to a CPU transfer, the local bus interface 34 sets the output of the register 87 and the output of the register 86 in the bus interface 55 as local DMA transfer parameters. Such a setting may be achieved via the DMA control line 93.

In order to generate the local DMA transfer parameters for DMA transfer, the DMA transfer control signal 83 is output to the DMA pointer generator 82 prior to a data transfer. The FIFO 2 reads the DMA access data located at a position designated by the read pointer 81, and outputs the DMA access data to the data line 65. The local bus interface 34 temporarily stores the DMA access data on the data line 65.

As soon as a local DMA transfer becomes possible, the bus interface 55 outputs a local DMA request signal 94 to the controller 22.

Upon receiving the local bus grant signal 29, the controller 22 instructs the bus interface 55 via the DMA control line 93 to start a local DMA transfer, and, in the case of a DMA transfer, outputs the local DMA transfer start signal 92 and the DMA transfer control signal 83. The FIFO 2 reads the DMA access data which is located at a position designated by the read pointer 81, and outputs the DMA access data thus read to the data line 65. The local bus interface 34 outputs the DMA access data on the data line 65 to the local data bus 28.

In the case of a CPU transfer, the local bus interface 34 outputs the CPU access data which was stored at the time of generating the local DMA transfer parameters to the local data bus 28.

Figure 2:
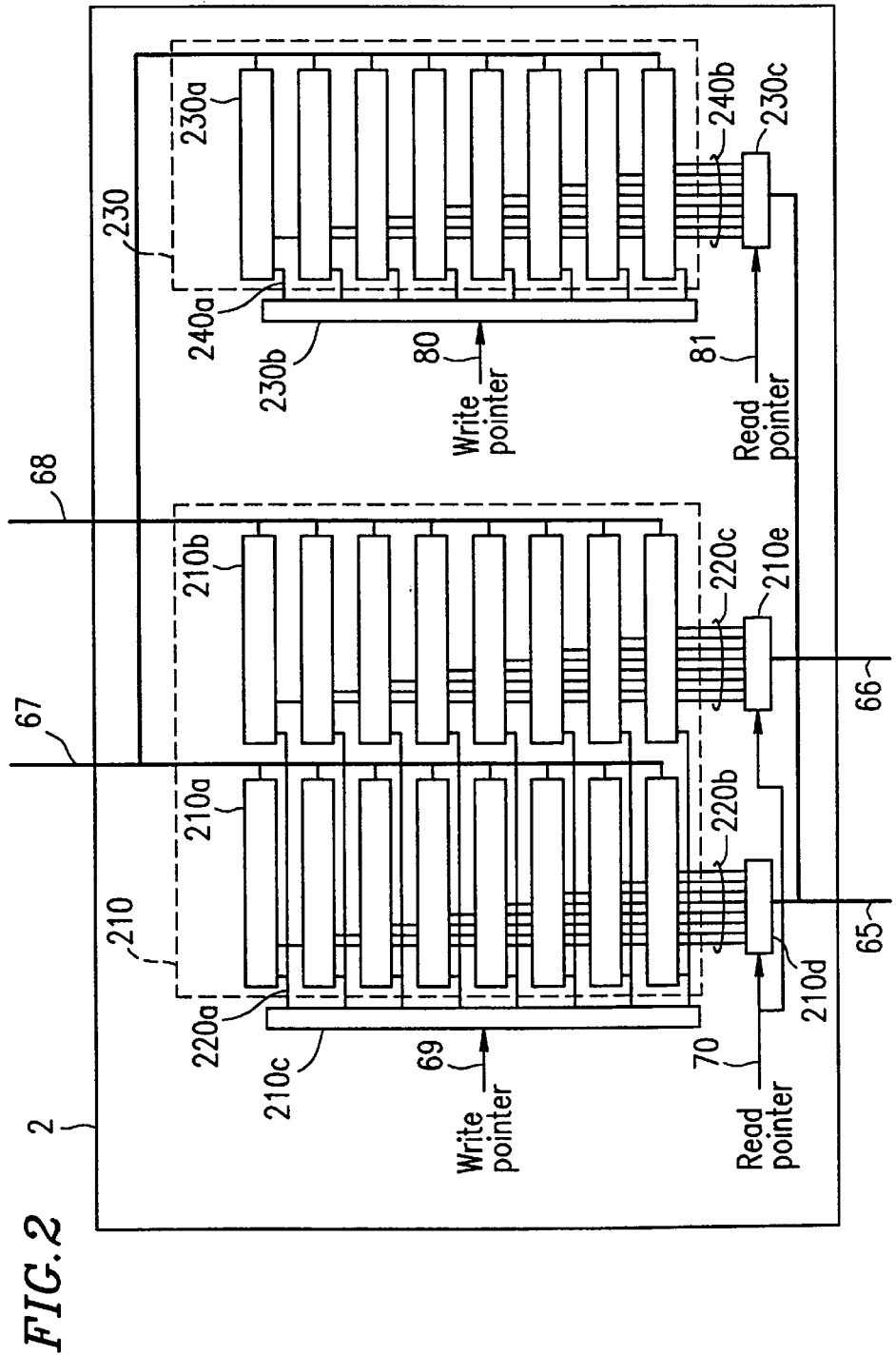
FIG. 2 is a schematic diagram illustrating an exemplary structure of a FIFO 2 shown in FIG. 1.

FIG. 2 illustrates an exemplary structure of the FIFO 2.

The FIFO 2 includes a data region for storing one or more words of CPU access data and a plurality of words of DMA access data. In the exemplary structure shown in FIG. 2, the data region is split into a data subregion 210 for CPU transfer for storing one or more words of CPU access data and a data subregion 230 for DMA transfer for storing a plurality of words of DMA access data. However, the data region does not need to be split in this manner. The data region of the FIFO 2 may be of any format that is capable of storing one or more words of CPU access data and a plurality of words of DMA access data.

The data subregion 210 dedicated for CPU transfer includes one or more CPU access data fields 210a and one or more CPU access address fields 210b. Each of the one or more CPU access data fields 210a stores one word of CPU access data. Each of the one or more CPU access address fields 210b stores the address of the CPU access data in a corresponding CPU access data field 210a.

The data subregion 230 for DMA transfer includes a plurality of DMA access data fields 230a. Each of the plurality of DMA access data fields 230a stores one word of DMA access data.

In the exemplary structure illustrated in FIG. 2, eight CPU access data fields 210a and eight CPU access address fields 210b are contained in the data subregion 210 for CPU transfer, whereas eight DMA access data fields 230a are contained in the data subregion 230 for DMA transfer.

However, the number of fields to be contained in the data subregions 210 and 230 is not limited to eight. Rather, the data subregions 210 and 230 may contain any number of fields. The number of fields in the data subregion 210 and the number of fields in the data subregion 230 may be different.

First, a data write operation to the FIFO 2 will be described.

In the case where CPU access data is input to the FIFO 2, one of a plurality of write control lines 220a which corresponds to a write position for the CPU access data is asserted in accordance with the write pointer 69. Such selective assertion is accomplished by means of a circuit 210c. As a result, the data on the data line 67 is written to the CPU access data field 210a which is coupled to the asserted write control line 220a, and an address on the address line 68 is written to the CPU access address field 210b which is coupled to the asserted write control line 220a.

In the case where DMA access data is input to the FIFO 2, one of a plurality of write control lines 240a which corresponds to a write position for the DMA access data is asserted in accordance with the write pointer 80. Such selective assertion is accomplished by means of a circuit 230b. As a result, data on the data line 67 is written to the DMA access data field 230a which is coupled to the asserted write control line 240a.

Next, a data read operation from the FIFO 2 will be described.

In accordance with the read pointer 70, a selector 210d selects one of respective outputs 220b associated with the plurality of CPU access data fields 210a, and outputs the selected output 220b to the data line 65.

Also in accordance with the read pointer 70, a selector 210e selects one of respective outputs 220c associated with the plurality of CPU access data fields 210b, and outputs the selected output 220c to the address line 66.

In accordance with the read pointer 81, a selector 230c selects one of respective outputs 230c associated with the plurality of DMA access data fields 230a, and outputs the selected output 230c to the data line 65.

If the read pointer 70 is negated, the outputs of the data selector 210d and the address selector 210e are in a high impedance state. If the read pointer 81 is negated, the output of the data selector 230c is in a high impedance state. Thus, data conflict can be avoided.

Figure 5:
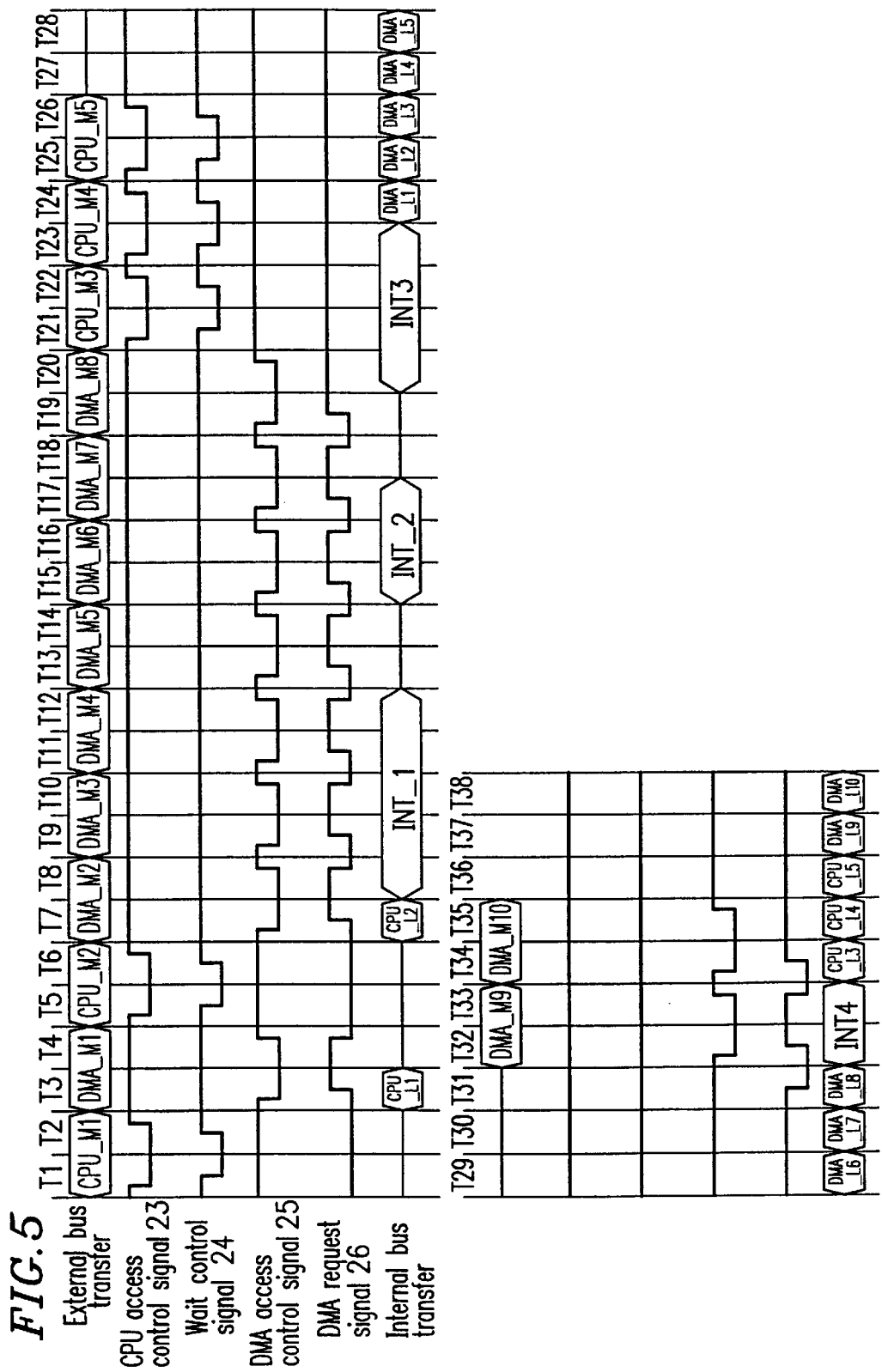
FIG. 5 is a cycle timing diagram illustrating an operation sequence of the data transfer apparatus 1 according to the present invention where both CPU transfers and DMA transfers are performed.
Figure 6:
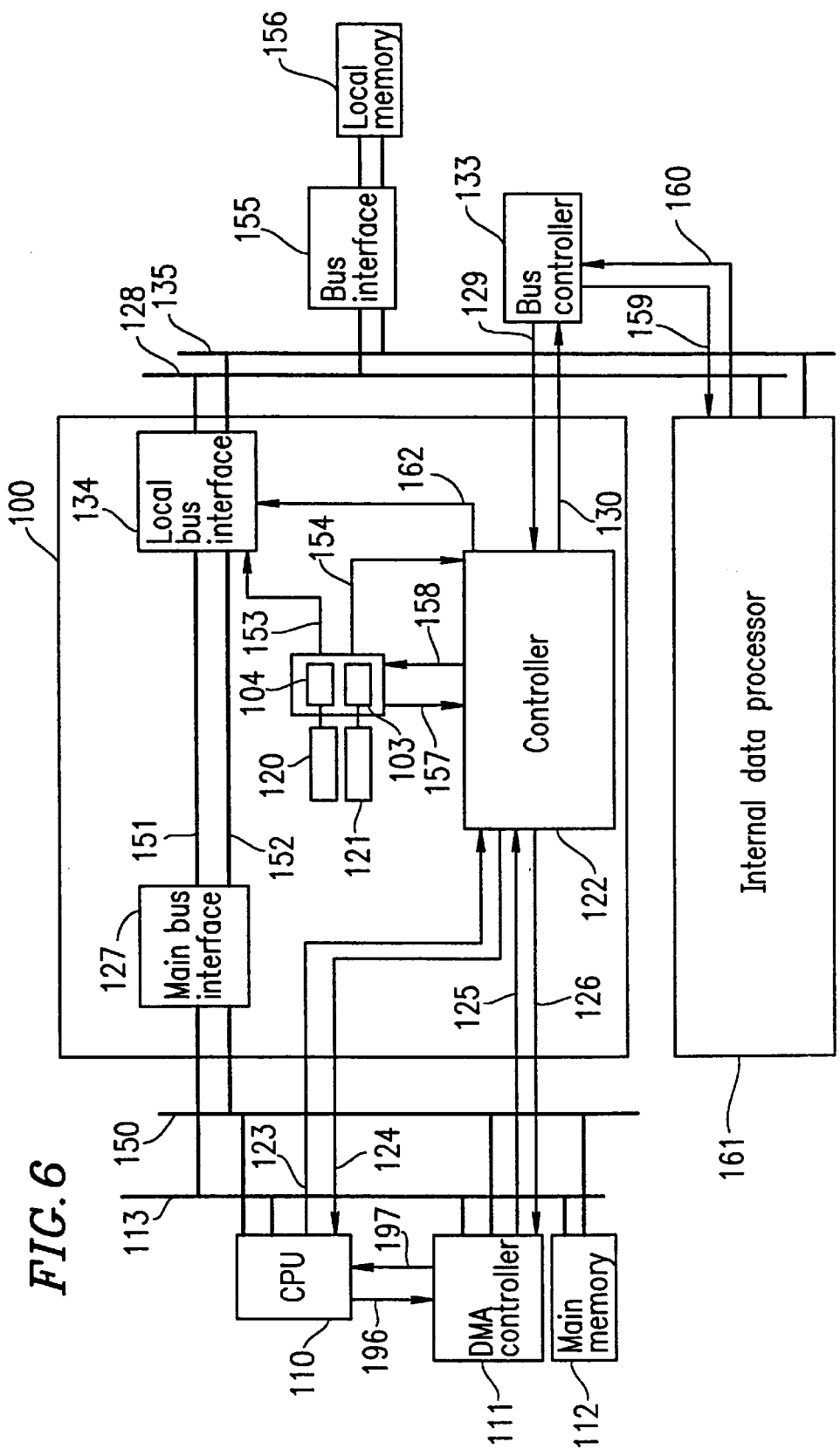
FIG. 6 is a block diagram illustrating a structure of a conventional data transfer apparatus 100.
Figure 7:
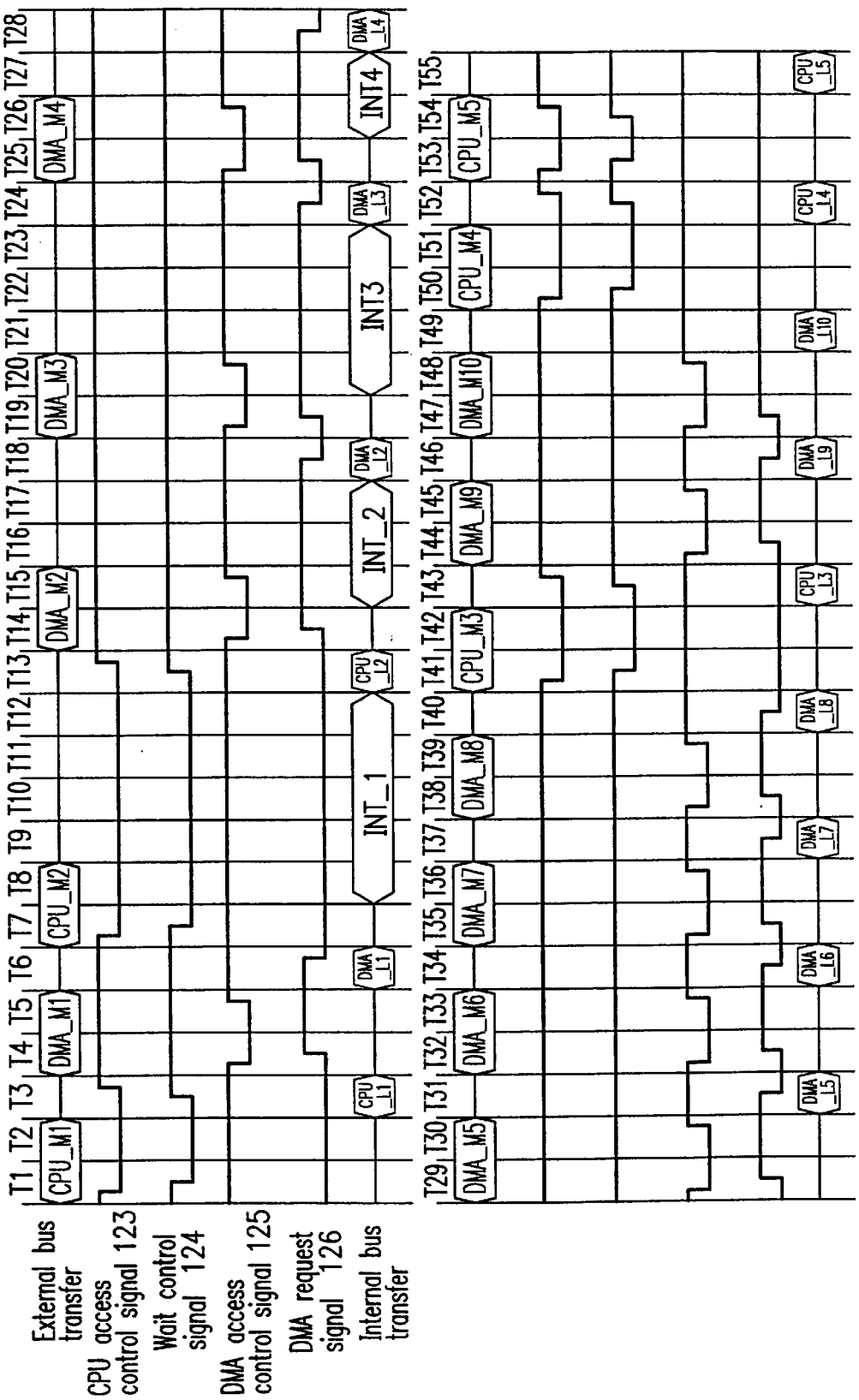
FIG. 7 is a cycle timing diagram illustrating an operation sequence of a conventional data transfer apparatus 100 where both CPU transfers and DMA transfers are performed.

FIG. 5 is a cycle timing diagram illustrating an operation sequence of the data transfer apparatus 1 in a case where both CPU transfers and DMA transfers are performed.

In FIG. 5, it is assumed that the L level of each signal corresponds to an asserted state of that signal, and the H level of each signal corresponds to a negated state of that signal.

In the example illustrated in FIG. 5, a one-word CPU transfer is performed five times, and a ten-word DMA transfer is performed one time.

It is assumed that the aforementioned initial values for DMA transfer are set prior to a cycle T1. The data transfer apparatus 1 asserts a DMA request signal 26. Detecting the assertion of the DMA request signal 26, the DMA controller 11 asserts a DMA transfer request signal 97.

Now, it is assumed that the CPU 10, although having detected the assertion of the DMA transfer request signal 97, will determine that a CPU transfer is to be made in the next and subsequent cycles. As a result, an external bus transfer (CPU_M1) between the CPU 10 and the data transfer apparatus 1 occurs during the cycles T1 and T2 (which cycles define a CPU basic access time). The CPU 10 begins to assert the CPU access control signal 23 in the cycle T1.

Upon detecting the assertion of the CPU access control signal 23, the data transfer apparatus 1 asserts the wait control signal 24. While the wait control signal 24 is being asserted, the CPU 10 is controlled so that neither a CPU transfer nor a DMA transfer can be made in the next and subsequent cycles.

At the end of the cycle T2, the data transfer apparatus 1 stores the data which is input from the main data bus 13 to the FIFO 2, and negates the wait control signal 24.

Upon detecting the negation of the wait control signal 24, the CPU 10 negates the CPU access control signal 23, and begins preparation for performing a CPU transfer or a DMA transfer in the next cycle. Herein, it is assumed that the CPU 10 detects the assertion of the DMA transfer request signal 97 and determines that a DMA transfer is to be made in the next cycle. In this case, the CPU 10 asserts a DMA transfer permission signal 96 which is output to the DMA controller 11.

Upon detecting the assertion of the DMA transfer permission signal 96, the DMA controller 11 performs an external bus transfer (DMA_M1) between the DMA controller 11 and the data transfer apparatus 1 during the cycles T3 and T4 (which cycles define a DMA basic access time), and asserts the DMA access control signal 25. The DMA access control signal 25 is asserted only during the DMA basic access time.

Upon detecting the assertion of the DMA access control signal 25, the data transfer apparatus 1 negates the DMA request signal 26.

In a cycle T3, an internal bus transfer (CPU_L1) occurs between the data transfer apparatus 1 and the local memory 56. During the internal bus transfer (CPU_L1), the CPU access data which is stored in the FIFO 2 is output to the local memory 56.

Upon detecting the negation of the DMA access control signal 25 in a cycle T4, the data transfer apparatus 1 asserts the DMA request signal 26.

From cycles T7 through T20, an external bus transfer between the DMA controller 11 and the data transfer apparatus 1 is continuously performed (i.e., DMA_M2 to DMA_M8).

During the cycles T7 through T20, any DMA access data that is input to the data transfer apparatus 1 will be stored in the data subregion 230 dedicated for DMA transfer in the FIFO 2. During this period, any DMA transfer from the DMA controller 11 will be performed in a periodic manner, with a cycle period equal to the DMA basic access time. During this period, the local bus will be temporarily occupied by the internal data processor 61, and internal bus transfers INT_1, INT_2, and INT_3 will be performed.

In a cycle T20, the data subregion 230 for DMA transfer in the FIFO 2 becomes full, and the DMA request signal 26 is negated until again asserted in a cycle T31. Therefore, the CPU 10 only performs CPU transfers in the cycle T21 and any subsequent cycles.

In a cycle T24, a burst output of a plurality of words of DMA access data stored in the data subregion 230 for DMA transfer in the FIFO 2 begins. It can be seen that the internal bus transfers (DMA_L1 to DMA_L8) are deferred due to the internal bus transfer (INT_3) during the cycles T20 through T23.

Once begun, the internal bus transfers (DMA_L1 to DMA_L8) corresponding to the plurality of words of DMA access data occur continuously.

In the cycle T31, the data subregion 230 for DMA transfer in the FIFO 2 becomes empty. Thus, the controller 22 again asserts the DMA request signal 26.

In cycles T32 and T33, an internal bus transfer (INT_4) occurs, followed by internal bus transfers (CPU_L3, CPU_L4, CPU_L5). In the data subregion 230 for DMA transfer in the FIFO 2, DMA access data to be transferred through external bus transfers (DMA_M9, DMA_M10) between the DMA controller 11 and the data transfer apparatus 1 are again stored.

In cycles T37 and T38, internal bus transfers (DMA_L9, DMA_L10) between the data transfer apparatus 1 and the local memory 56 occur.

Thereafter, any DMA transfer will be resumed only after the aforementioned initial values for DMA transfer are again set by the CPU 10 in advance.

Thus, according to the present example, the FIFO 2 is controlled in such a manner that a plurality of words of DMA access data stored in the FIFO 2 are burst transferred to the local memory 56, and that one or more words of CPU access data stored in the FIFO 2 are consecutively transferred to the local memory 56. By controlling the FIFO 2 in this manner, it becomes possible to reduce the period during which the wait control signal 24 is asserted. As a result, the operation wait time of the CPU 10 (which arbitrates the right to use the main buses) due to the assertion of the wait control signal 24 can be reduced. Consequently, the overall data transfer rate of the entire system including the data transfer apparatus 1 and any peripheral devices associated therewith can be improved.

In the case where data is to be transferred from the local memory 56 to the CPU 10, the transfer must be controlled so that the data is output directly from the local data bus 28 to the main data bus 13. When transferring data from the local memory 56 to the DMA controller 11, the transfer must be controlled in such a manner that the data on the local data bus 28 is temporarily stored in the FIFO 2 through a burst transfer and then the data stored in the FIFO 2 is transferred to the DMA controller 11 in a word-by-word manner by using the DMA request signal 26.

EXAMPLE 2

Figure 3:
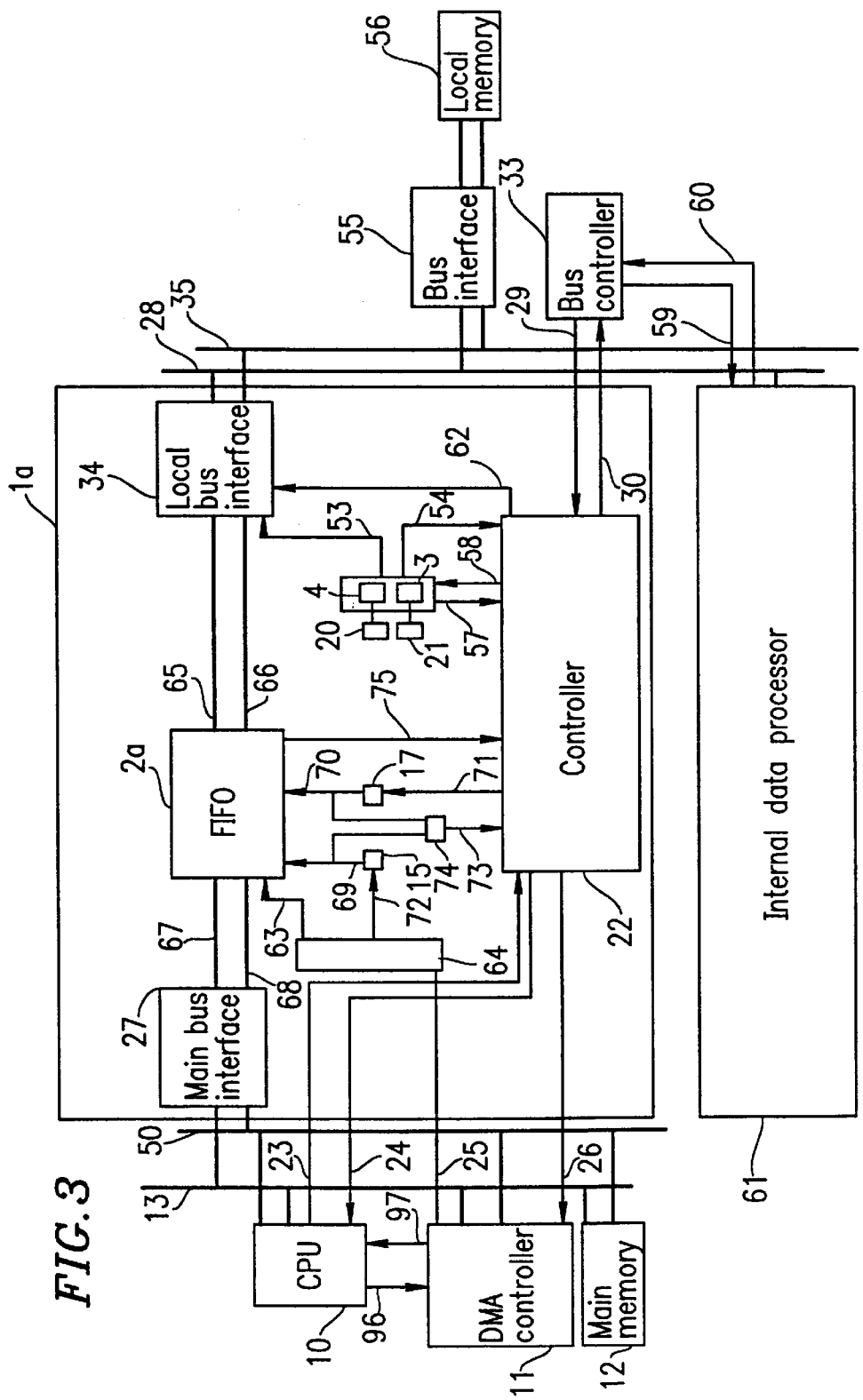
FIG. 3 is a block diagram illustrating a structure of a data transfer apparatus 1a according to Example 2 of the present invention.

FIG. 3 is a block diagram illustrating the structure of a data transfer apparatus 1a according to Example 2 of the present invention.

In FIG. 3, those component elements which also appear in FIG. 1 are denoted by the same reference numerals as those used therein, and the description thereof is henceforth omitted.

Figure 4:
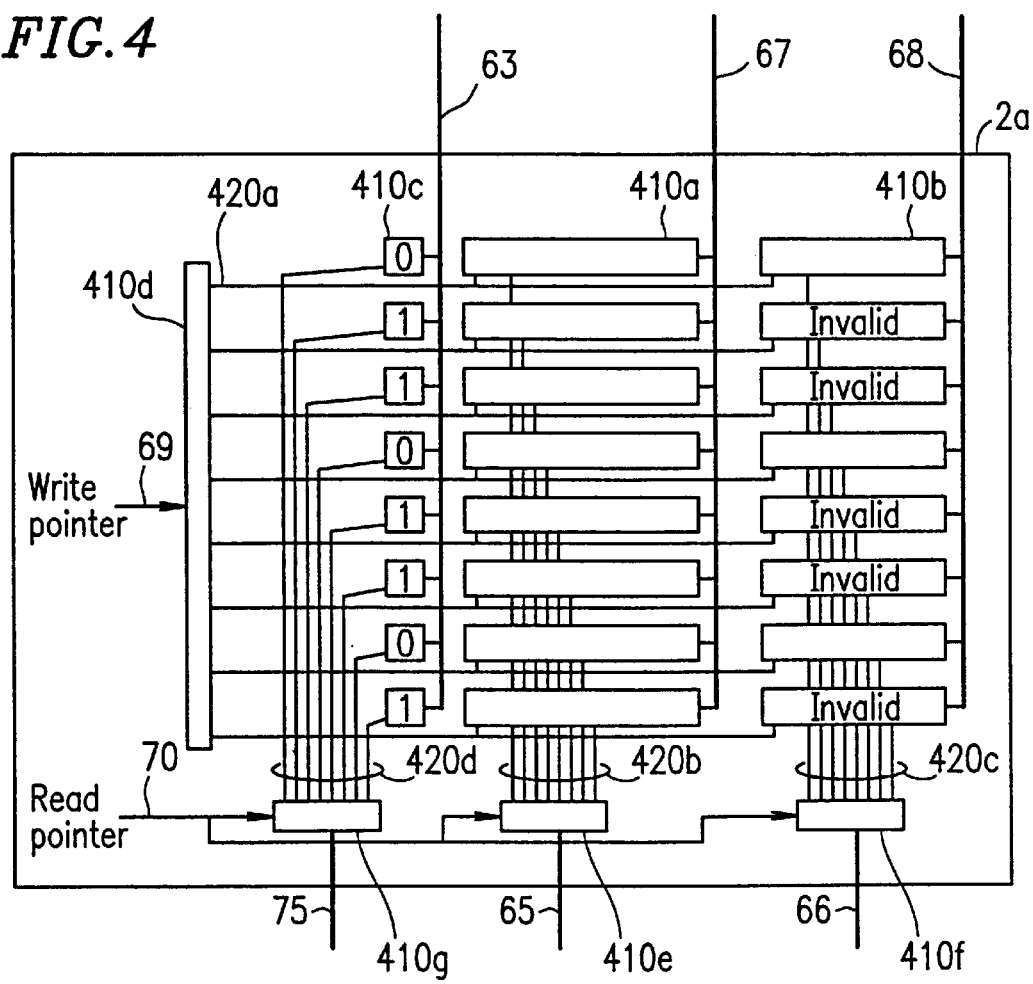
FIG. 4 is a schematic diagram illustrating an exemplary structure of a FIFO 2a shown in FIG. 3.

FIG. 4 is a schematic diagram illustrating an exemplary structure of a FIFO 2a included in the data transfer apparatus 1a.

The FIFO 2a includes a plurality of data fields 410a, a plurality of address fields 410b, and a plurality of access determination fields 410c. Each of the plurality of data fields 410a stores one word of CPU access data or one word of DMA access data. Each of the plurality of address fields 410b stores the address of the data stored in a corresponding data field 410a. Each of the plurality of access determination fields 410c stores information representing the kind of data stored in a corresponding data field 410a.

If the data stored in a given data field 410a is CPU access data, then "0" is stored in the access determination field 410c corresponding to that data field 410a. If the data stored in a given data field 410a is DMA access data, then "1" is stored in the access determination field 410c corresponding to that data field 410a.

If the data stored in a given data field 410a is DMA access data, an arbitrary value indicating that the address is invalid is stored in the address field 410b corresponding to that data field 410a.

In the exemplary structure of the FIFO 2a illustrated in FIG. 4, eight data fields 410a, eight address fields 410b, and eight access determination fields 410c are contained in the FIFO 2a. However, the number of fields to be contained in the FIFO 2a is not limited to eight. Rather, the FIFO 2a may contain any number of fields.

First, a data write operation to the FIFO 2a will be described.

One of a plurality of write control lines 420a which corresponds to a write position is asserted in accordance with a write pointer 69. Such selective assertion is accomplished by means of by a circuit 410d. As a result, the data on the data line 67 is written to the data field 410a which is coupled to the asserted write control line 420a; an address on the address line 68 is written to the address field 410b which is coupled to the asserted write control line 420a; and an access determination signal on the signal line 63 is written to the access determination field 410c which is coupled to the asserted write control line 420a.

Next, a data read operation from the FIFO 2a will be described.

In accordance with a read pointer 70, a selector 410e selects one of respective outputs 420b associated with the plurality of data fields 410a, and outputs the selected output 420b to the data line 65.

Also in accordance with the read pointer 70, a selector 410f selects one of respective outputs 420c associated with the plurality of address data fields 410b, and outputs the selected output 420c to the address line 66.

Also in accordance with the read pointer 70, a selector 410g selects one of respective outputs 420d associated with the plurality of access determination fields 410c, and outputs the selected output 420d to a signal line 75.

The internal operations of the data transfer apparatus 1a will be described with reference to FIGS. 3 and 4.

The data and the local memory address which are output from the CPU 10 along with the CPU access control signal 23 are temporarily stored in the main bus interface 27.

An access determiner 64 generates an access determination signal 63 based on the CPU access control signal 23 and the DMA access control signal 25. If the access determiner 64 detects the CPU access control signal 23 being asserted and the DMA access control signal 25 being negated, then the access determiner 64 generates the access determination signal 63 with a value "0". If the access determiner 64 detects the CPU access control signal 23 being negated and the DMA access control signal 25 being asserted, then the access determiner 64 generates the access determination signal 63 with a value "1". The access determination signal 63 is output to the FIFO 2a.

The access determiner 64 outputs a write pointer generation request signal 72 to the write pointer generator 15.

The write pointer generator 15 generates the write pointer 69 by incrementing a previous write pointer by one word in response to a write pointer generation request signal 72. The generated write pointer 69 is output to the FIFO 2a.

The access determination signal 63 is written to the access determination field 410c which is located at a position designated by the write pointer 69. The CPU access data on the data line 67 is written to the data field 410a which is located at a position designated by the write pointer 69. The CPU access address on the address line 68 is written to the address field 410b which is located at a position designated by the write pointer 69.

Thus, both CPU access data and DMA access data are indiscriminately stored in the FIFO 2a.

Initial values for DMA transfer can be set in the same manner as in Example 1.

The pointer comparator 74 compares the write pointer 69 and the read pointer 70, and outputs a FIFO flag 73 to the controller 22, where the FIFO flag 73 has a value in accordance with the comparison result. The value of the FIFO flag 73 is "0" when there is no access data stored in the FIFO 2a; the value of the FIFO flag 73 is "1" when there is data stored in the FIFO 2a; and the value of the FIFO flag 73 is "2" when the number of data stored in the FIFO 2a is equal to the upper limit of the number of data storable in the FIFO 2a.

The controller 22 outputs a local bus request signal 30 to the bus controller 33. Upon detecting the assertion of a local bus grant signal 29, the controller 22 outputs a read pointer generation request signal 71 to the read pointer generator 17.

The read pointer generator 17 generates the read pointer 70 by incrementing a previous read pointer by one word. The generated read pointer 70 is output to the FIFO 2a.

The FIFO 2a outputs to the data line 65 the data stored in the data field 410a which is located at a position designated by the read pointer 70. The FIFO 2a outputs to the address line 66 the address stored in the address field 410b which is located at a position designated by the read pointer 70. The FIFO 2a outputs to the signal line 75 the signal stored in the access determination field 410c which is located at a position designated by the read pointer 70.

If the access determination signal on the signal line 75 is "0", the controller 22 determines that the data which has been output from the FIFO 2a is CPU access data. The controller 22 outputs a local bus control signal 62 to the local bus interface 34, which then outputs the data on the data line 65 to the local data bus 28 and the address on the address line 66 to the local address bus 35.

If the access determination signal on the signal line 75 is "1", the controller 22 determines that the data which has been output from the FIFO 2a is DMA access data. The controller 22 outputs a DMA address generation request signal 58 to the adder 4 and the subtracter 3. The adder 4 increments a previous DMA address by one word, and outputs the result to the DMA address line 53. The subtracter 3 decrements a previous number of remaining words to be DMA-transferred by one word, and outputs a DMA address generation complete signal 54 to the controller 22. If the number of remaining words to be DMA-transferred becomes one, the subtracter 103 asserts a number-of-remaining-words to be DMA-transferred flag 57.

The controller 22 outputs the local bus control signal 62 to the local bus interface 34, which then refers to the address selection field of the local bus control signal 62. As a result, the local bus interface 34 outputs the address on the DMA address line 53 to the local address bus 35.

While the bus controller 33 is granting the right to use the local bus to the data transfer apparatus 1a, the controller 22 outputs the read pointer generation request signal 71 until the number-of-remaining-words to be DMA-transferred flag 57 indicating there is DMA access data in the FIFO 2a is asserted.

In the aforementioned examples, during a DMA transfer, data is transferred in a word-by-word manner from the DMA controller to the FIFO, and is burst transferred in units equal to the capacity of the FIFO from the FIFO to the local memory. The optimum capacity of the FIFO varies depending on the rates of the external bus transfer cycle and the internal bus transfer cycle, transfer ratio, and/or area that the FIFO occupies within a chip. This aspect will be discussed below in terms of bus usage ratios.

Assuming that each DMA transfer by the CPU or the DMA controller incurs an internal bus occupancy of 10%; each change in the owner of the right to use the internal bus incurs an internal bus occupancy of 5%; and the internal data processor incurs an internal bus occupancy of 80%, it follows that an external bus transfer can be continuously performed under the condition that the amount of time required for the basic cycle of an external bus transfer of one word is 10 times the amount of time required for the basic cycle of an internal bus transfer of one word.

However, in practice, the capacity of the FIFO should be made as large as possible in case the internal data processor continuously occupies the internal bus. However, since any increase in the area of the FIFO within a chip leads to an increase in the chip cost, it would be difficult to design a FIFO with a capacity on the order of tens of words. For these reasons, the optimum capacity of the FIFO is considered to be about 20 words.

According to the present invention, a first-in-first-out buffer is provided between a main bus and a local bus. The first-in-first-out buffer has a data region for storing one or more words of CPU access data and a plurality of words of DMA access data. As a result, it is possible to perform a data transfer between the main bus and the first-in-first-out buffer even while the local bus is used by a processing block other than the data transfer apparatus. Consequently, the data transfer rate can be improved.

According to the present invention, the controller executes local DMA transfers in units, where each unit includes the plurality of words of DMA access data stored in the data region of the first-in-first-out buffer, and makes a request to use the local bus per unit of local DMA transfer. As a result, it is possible to reduce the number of requests made to use the local bus. Consequently, the number of cycles required for acquiring the right to use the local bus can be reduced, thereby improving the utility of the local bus.

According to the present invention, it is possible to execute transfers of one or more words of CPU access data stored in the data region of the first-in-first-out buffer and transfers of a plurality of words of DMA access data stored in the data region of the FIFO, both in the form of local DMA transfers. As a result, the local address buses can be obviated.

According to the present invention, the first-in-first-out buffer may further include a region for storing information with which to determine whether the data stored in the data region of the first-in-first-out buffer is CPU access data or DMA access data. As a result, both CPU access data and DMA access data can be indiscriminately stored in a first-in-first-out buffer having a relatively small capacity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data transfer apparatus for transferring data from a main memory coupled to a main bus to a local memory coupled to a local bus, the data transfer apparatus comprising:
a first-in-first-out buffer having a data region for storing one or more words of CPU access data which is accessed by a CPU coupled to the main bus, and a plurality of words of DMA access data which is accessed by a DMA controller coupled to the main bus; and
a controller for controlling the first-in-first-out buffer,
wherein, when the local bus is available, the controller controls the first-in-first-out buffer so as to consecutively transfer the one or more words of CPU access data stored in the data region to the local memory, and to burst transfer the plurality of words of DMA access data stored in the data region to the local memory.

2. A data transfer apparatus according to claim 1, wherein the controller executes local DMA transfers in units, where each unit comprises the plurality of words of DMA access data stored in the data region, and makes a request to use the local bus per unit of local DMA transfer.

3. A data transfer apparatus according to claim 1, wherein the controller executes the transfer of the one or more words of CPU access data stored in the data region in the form of a local DMA transfer, and the transfer of the plurality of words of DMA access data stored in the data region in the form of a local DMA transfer.

4. A data transfer apparatus according to claim 1, wherein the first-in-first-out buffer further includes a region for storing information with which to determine whether the data stored in the data region is CPU access data or DMA access data.

* * * * *